United States Patent [19]

Stenström

[11] Patent Number: 4,808,783
[45] Date of Patent: Feb. 28, 1989

[54] HEAT STABLE MICROWAVE ENERGY STERILIZATION METHOD

[75] Inventor: Lennart Stenström, Trosa, Sweden

[73] Assignee: Alfastar AB, Sweden

[21] Appl. No.: 124,112

[22] PCT Filed: Feb. 25, 1987

[86] PCT No.: PCT/SE87/00092
§ 371 Date: Oct. 27, 1987
§ 102(e) Date: Oct. 27, 1987

[87] PCT Pub. No.: WO87/05460
PCT Pub. Date: Sep. 11, 1987

[30] Foreign Application Priority Data

Mar. 3, 1986 [SE] Sweden ............................ 8600941

[51] Int. Cl.⁴ ............................................. H05B 6/78
[52] U.S. Cl. ..................... 219/10.55 M; 219/10.55 A; 219/10.55 F; 426/241; 99/451
[58] Field of Search ............... 219/10.55 M, 10.55 A, 219/10.55 R, 10.55 F, 10.55 E, 10.55 B; 99/325, 451, DIG. 14; 426/241, 243, 234

[56] References Cited

U.S. PATENT DOCUMENTS

| 3,277,580 | 10/1966 | Tooby | 219/10.55 A |
| 3,365,562 | 1/1968 | Jeppson | 219/10.55 A |
| 3,809,845 | 5/1974 | Stenstrom | 219/10.55 M |
| 3,814,889 | 6/1974 | Stenstrom | 219/10.55 M |
| 4,401,884 | 8/1983 | Kusunoki et al. | 219/10.55 MX |
| 4,525,615 | 6/1985 | Wyland | 219/10.55 M |
| 4,553,011 | 11/1985 | Nakata et al. | 219/10.55 B |

FOREIGN PATENT DOCUMENTS

| 0064082 | 11/1982 | European Pat. Off. |
| 0070728 | 1/1983 | European Pat. Off. |
| 0077360 | 7/1978 | Japan |
| 0150371 | 9/1982 | Japan |
| 0189674 | 11/1982 | Japan |
| 0202275 | 12/1982 | Japan |
| 0013372 | 1/1983 | Japan |
| 0023774 | 2/1983 | Japan |
| 0647133 | 12/1978 | Switzerland |
| 0963473 | 7/1964 | United Kingdom |

Primary Examiner—Philip H. Leung
Attorney, Agent, or Firm—Lerner, David, Littenberg, Krumholz & Mentlik

[57] ABSTRACT

A continuous method for heating a product having at least one faster microwave heating portion and at least one slower microwave heating portion to a uniform predetermined temperature sufficient to sterilize the product without loss of odor, taste, texture, color or vitamin content quality by transporting the product through a plurality of microwave fields including a first higher energy field and one or more successively lower energy fields, in which the first microwave field is attenuated to an energy level sufficient to heat the fast microwave heating portions of the product to the predetermined temperature, the successively lower energy microwave fields are attenuated to an energy level sufficient to maintain the temperature of the faster heating portions and heat the slower heating portions to the predetermined temperature, and the transport of the product through the successively lower energy microwave fields is continued until the slower microwave heating portions of the product reach the predetermined temperature.

13 Claims, 3 Drawing Sheets

HEAT STABLE MICROWAVE ENERGY STERILIZATION METHOD

The present invention relates to a method for applying microwave energy in a continuous process for heat stabilization of products and providing treatment conditions that guarantee an end quality close to the quality of fresh or unprocessed products, also for products which are not very resistant to processing and which by experience are difficult to process.

The products of interest primarily are food products, for instance meat, fish, fruit and vegetables and also pharmaceutical compounds as dispersions of nutrition.

It is known to apply microwave energy for heat stabilization in continuous processes.

U.S. Pat. No. 3,809,845 (Stenstrom) represents the state of the art from which the present invention starts.

The contents of another U.S. Pat. No. 3,263,052 (Jeppson) represents the idea of applying mutually different power levels along a conveyor tunnel in a continuous process. In that context the idea is to apply a maximum of energy at a first stage and thereafter reduce the energy supply as the water contents of the product decreases.

Because the primary idea of the present invention is to apply processes for heat stabilization that allow sterilization or pasteurization, the first mentioned patent represents to a substantial extent also the problem in the present context, while the latter patent has less relevance because it relates to drying processes having entirely different prerequisites.

The heat stabilization which is meant has for its purpose to inactivate enzymes and microorganisms without introducing a lower quality, for instance flavour of food stuff. For a long time it has been known that such stabilization should be carried out in a very short time in order to realize the object. Especially for solid or viscous food, microwave are the single means for a sufficiently quick heating. However, generally microwaves heat food stuff or similar products not very uniformly—it is not unusual that a portion of the heated product is given three times higher temperature than another portion. However, this can seldomly be accepted because the quality of the product is reduced quickly when the temperature is too high. When packaging products in plastics there, additionally, is a temperature limit above which the packaging material melts, reacts with the product that is packed or is damaged in some other way. A major step towards a uniform processing is disclosed in said U.S. Pat. No. 3,809,845 where heat stabilization is carried out in a medium surrounding the product and where the medium has a dielectric constant approximately equal to the constant of the product, and where the temperature of the surrounding medium is controlled such that the medium cools the surface of the product in order not to reach a temperature higher than the one desired inside the product.

Some products do require further technique for heat stabilization the product without loss of quality (smell, taste, texture, colour, vitamin contents etc.). One reason for this is that several parameters, individually or together cause a temperature distribution when heating by microwaves.

Such a parameter is inhomogenity of the product. The product may for instance consist of several constituents, for instance potatoes, onion and meat in smaller or larger pieces. Due to the loss factor and the dielectric constant of the microwaves, the several constituents of the product will be given different heating. The distribution and the location inside the product of the several constituents are also important to the heating.

The product may also be a products layered of material types having different loss factors etc. In such a case a layer comprising two materials A and B may give a higher temperature in A when microwave heating at a certain layer orientation, and in B at an other layer orientation. A piece of side flesh may represent a layered product. Another factor the effect of which is temperature distribution is the existence of standing waves in the microwave field inside the product.

Furtheron, tendencies of a too high heating of the edges of the prouct may be observed if the dielectric constant of the product differs too much from the one of the surrounding medium.

A fourth factor which may give colder or warmer layers inside the product is the fact that the microwaves are attenuated when propagating inside the product, but also counter-meansures again the effects of such attenuation in the form of a compensated heating and cooling by means of appropriate media contacting the outside of the product, for instance according to the said U.S. Pat. No. 3,809,845.

Furtheron, also very well tuned applicators of microwaves do give certain remaining discontinuities in the microwave field resulting in warmer and colder passages inside the product, generally parallel to the transport direction past the applicators.

Additionally, each one of the sources mentioned and causing temperature distribution may coact or interfere with the rest of them resulting in a heating process which may give the product temperture peaks here and there and which would cause severe local quality detoriation or cause formation of vapour which wuld mean sabotage of the process at the same time, at other locations inside the product there would be regions which would have been heated just noticeably.

The said temperature distribution phenomenom is of a moderate magnitude in a material having low microwave absorption, for instance plastics, rubber, bread and dry products in general but is considerable in pharmaceutical products and in food products having a high water contents, as meat, fish, vegetables, berries, stews and soups.

Now, in a continuous microwave process where a continuous flow of product units passes microwave applicators, the problem is to increase the temperature of the regions of such water containing products being most unwilling of heating in the shortest possible time, such that the desired heat stabilization affect may be obtained without a deterioated product quality.

In order to elucidate the huge interest of heating, in certain cases heat stabilizing, products by applying microwave energy, it may be proper to refer to the following publications which, however, completely avoid dealing with continuous process technique but still might be of interest:

U.S. Pat. No. 4,370,535 relates to a household oven where a magnetron is arranged for thawing food stuff such that the output power varies depending on the temperature of the product. Such temperature is measured in discrete measuring points.

In U.S. Pat. No. 4,506,127 which also relates to a household oven, the output power is reduced "at the end" of a heating process.

U.S. Pat. No. 4,508,948 relates to a microwave oven having a variable output power. A micro computer is used and controls the output power based on the weight of the product and empirically established optimum parameters.

In UK No. 963 473 there is a water buffer system which compensates for a decreased water contents in the product as the product is supplied by microwave energy which is maintained at a constant level.

European patent application having publication No. 64 082 relates to a microcomputer controlled microwave oven system where a "natural defrosting" is obtained during a short time period.

Microwave applications in connection with food stuff may also be found in a number of abstracts of Japanese patent applications. For instance Japanese patent application having publication No. 53-77360 relates to a control system for a microwave oven where, in order to reveal the effects of different original temperatures of products which are placed in the oven for heating, a continuous measurement of the temperature is carried out for terminating the heating at a desired temperature level without any need for additional time.

In the Japanese publication No. 57-150371 there is described a sterilizing system for food stuff where microwave energy is supplied to a product, which may be pressurized, when it flows in a pipe.

The Japanese publication No. 57-189674 deals with retorting by using microwave energy and a specific formstable closure of a packaging container.

The Japanese publication No. 57-202275 relates to a further system for microwave heating of a pressurized food stuff product.

In the Japanese publication No. 58-13372 there is described a packaging system where water having an acceptable dielectric constant is used as a medium for absorption of microwave energy for preventing vapour formation in a sealed package.

The Japanese publication No. 58-23774 also relates to a method of preventing "explosion" of a sealed package due to vapour formation. A powder having a high dielectric constant is added along a sealing area.

In the Swiss Pat. No. 647 131 there is described a method of processing a product having constituents of different characteristics. The method is based on the fact that solid constituents are separated from floating constitutents.

In a further European patent application having publication No. 70 728 there is described a multi-step procedure for thawing where a microcomputer is used for controlling the supply of energy relative the weight.

As previously mentioned the basic object of the present invention is to provide a method useful for a continuous process and which means total heating time which is so short that the quality of the product will not be deteriorated as far as taste and other characteristics are concerned.

The heating time should be minimized relative the time allowed by the continuous process, and of course with due consideration of the characteristics of the product.

The comprehensive litterature list given does not solve the present problem.

Therefore, the invention uses a method of heating where the heating should be carried on to a desired temperature for stabilizing water containing food products or pharmaceutical products contained in microwave transparent packaging material and which are heat treated continuously by being transported through a heat treatment channel where microwave of different strength are supplied for heating the product and where the product when being passed through the microwave channel first will be affected by a microwave field having a certain strong heating effect, whereafter the product is moved out of this strong field and moved into a field of a lower heating effect.

The method is characterized in that the microwave energy which is transferred to the product in the field having a strong heating effect is selected such that a quickly heated portion of the product reaches a predetermined temperature which is higher than the desired temperature, and such that the power of the field having the lower heating effect is selected such that said portion of the product maintains said predetermined temperature or a temperature just below, and that the heating in the field of the lower heating effect is given at least such a duration that a portion of the product which is heated slowly reaches said desired temperature.

In a practical embodiment the said predetermined temperature is selected generally equal to the maximum allowed product temperature.

In most cases the desired temperature is selected generally equal to the temperature required for heat sterilization, for instance sterilization or pasteurization, of the product.

In one embodiment of the invention the product enclosed in a microwave transparent material is encompassed by a liquid medium, for instance water, having a dielectric constant of the same magnitude as the product. The temperature of the liquid medium is controlled such that the medium cools the surface of the product and the temperature of the medium is allowed to reach the temperature desired for the product at the end of the heating.

Knowledge of the temperature distribution in the product which is processed in the continuous process is obtained, according to one embodiment of the invention, by means of a number of temperature sensors which are stuck into the product at empirically found suitable positions in samples of the product, whereby the continuous heating process may be adjusted successively and manually according to the basic principal of the invention.

In a further embodiment of the present invention, information of temperature is obtained by measuring ultrasound velocity which facilitates automatization of the heat processing method.

Still one embodiment of the present invention is based on collecting the necessary temperature information for carrying out the heat processing method also automatically by sensing and computer processing from the surface of the product and the inside thereof outgoing electromagnetic radiation in a manner known within the art of meteorology.

In order to illustrate the inventive idea a description will now be made by reference to the accompanying drawings where as a specific issue sterilization of food having a neutral pH and a high water contents, for instance a concentrated meat stew containing vegetables, has been selected.

Figure 1:
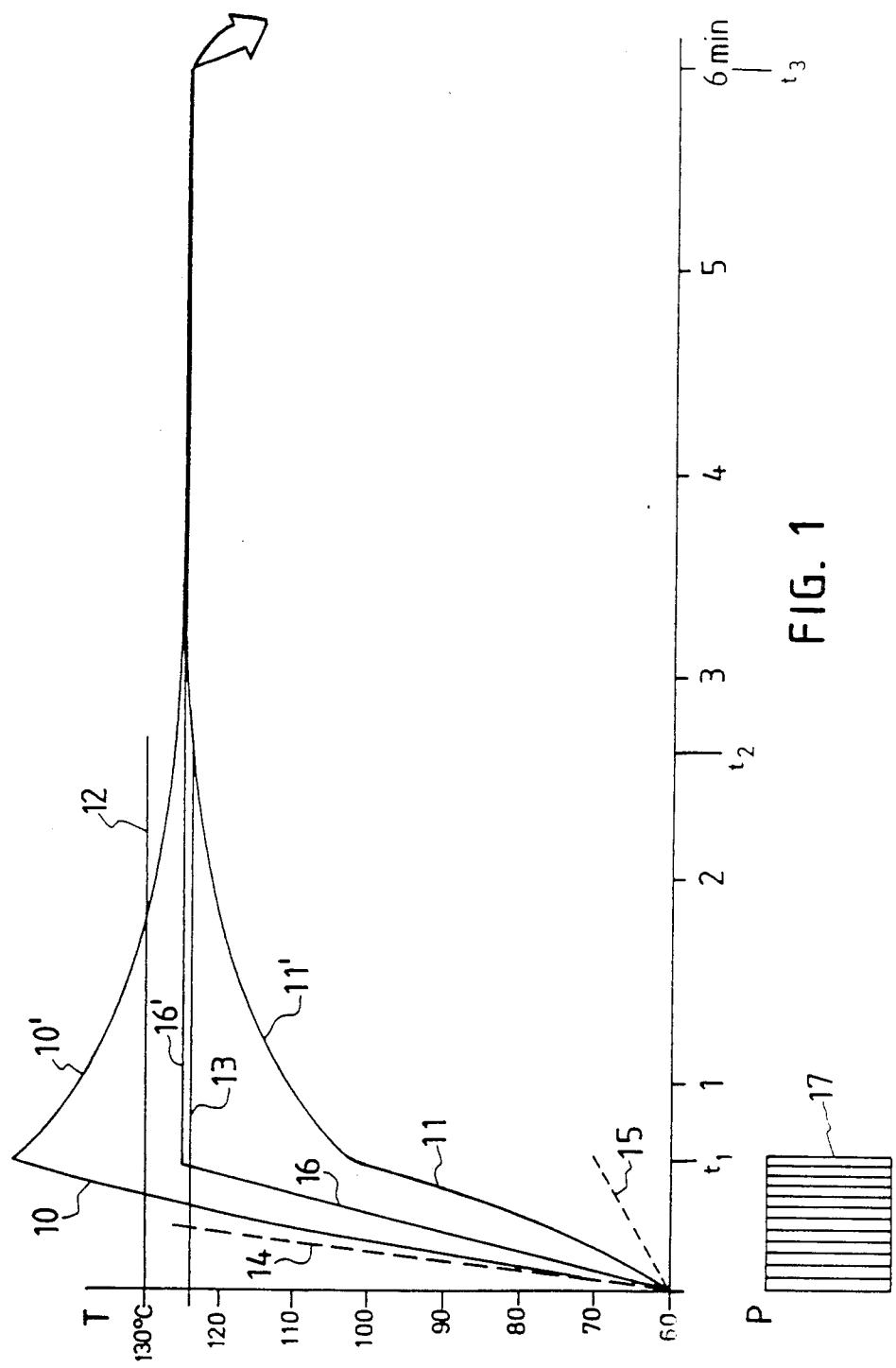
FIG. 1 shows a temperature time graph for a conventional process for heating by microwaves.

The curve portion denoted by reference numeral 10 in FIG. 1 represents the fast heated portion of the product, for instance the surface thereof. The reference numeral 11 refers to the temperature of the portion of the product which is "slow" to heat.

The level 12 represents the maximum allowed temperature. The level 13 represents the temperature which is to be reached by the entire product, in this case the temperature necessary for sterilization.

The tangent of the curve 10 at origo shown by broken lines 14 represents the microwave heating of the fast heated portion, while the tangent denoted by the reference numeral 15 represents the corresponding parameter of the portion which is slow to heat.

The curve represented by the reference numeral 16 represents the average temperature of the product. The microwave power supplied as a function of time is represented by a pulse 17.

At the initial state it is assumed that the product which is to be microwave heated has a certain uniform temperature (60° C. in the example).

When the supply of microwave power is started, the fast heated portion of the product raises its temperature according to curve 14, several times faster than the portion 15 which is slow to heat. As soon as the temperatures of said two portions start to deviate from each other, heat is transferred, by conduction and possibly convection, inside the product from the hot portion(s) to the cold portion(s). The curve 10 is therefore obtained instead of 14 for the portion which is fast heated and the curve 11 instead of 15 for the colder portion. Between said curves the average temperature curve 16 is to be found. The inclination of 16 basically is directly related to the magnitude of the microwave power 17. To get the curve 11' of the colder portion to reach the predetermined temperature 13 the average temperature 16 has to pass said level. This means that there is necessary a certain surface contents of the microwave puls 17, i.e. there is required a certain supplied power.

When the average temperature 16 has passed the level 13, in the conventional process, it is generally unavoidble that the temperature 10, 10' of the fast heated portions exceeds the allowed level 12 during a certain time period. This means quality detoriation of said portions and certain risks. The packaging material may be damaged if it is affected by peak temperatures. Vapour may be formed in the product if the process is not carried out in an environment having an over-dimensioned over-pressure. The vapour immediately destroys the process in that the heat transfer changes the charcteristics thereof in the product and the microwaves get wild due to geometric changes in the load thereof, i.e. the product. That which has been said is an explanation to the fact that so many failures exist in the microwave sterilization field in spite of the fact that very expensive development work has been put in.

After the time $t_1$ the microwave pulse 17 is terminated and the temperature curves 10 and 11 start to converge. At the time $t_2$ the temperature curve 11 of the colder portion intersects the temperature level 13 necessary for the sterilization. After a certain stand-by time at or just above said level, the product has obtained the desired sterile state. Then the product is cooled (at the time $t_3$).

A minor increase in the level 13 would mean that the desired sterile state would be reached considerably faster implying a better maintenance of the original quality of the product. But the level 13 cannot be increased, instead it is much too high in the example, indicating that the temperature of the fast heated portion raises a considerable bit over the allowed temperature with the results pointed out above.

Actually the level 13 has to be drastically decreased or the microwave energy 17 distributed over a substantially longer time for being approved by the fast heated portion of the product. However, in order to reach the sterile state, the time at a heated condition has to be increased drastically which leads to a prolonged heat treatment of the entire product and as a result of this a lower quality.

Figure 2:
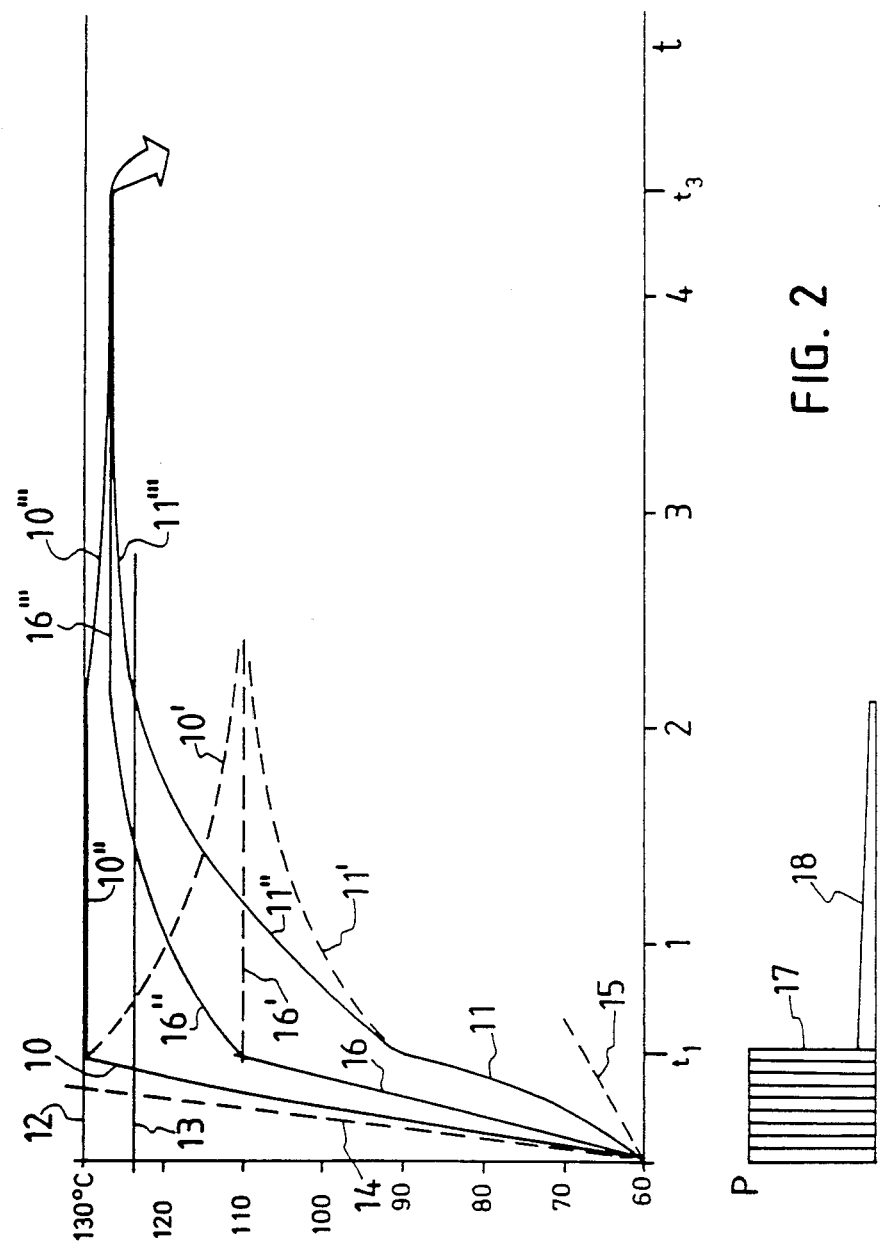
FIG. 2 shows a temperature time graph for the process according to the present invention.

Now, with reference to FIG. 2 the improved process according to the present invention will be describe. The reference numerals 10, 10', 11, 11' etc. to 16, 16' and 17 have the corresponding meaning as in FIG. 1.

Two important steps are clearly indicated in the new process. One is the fact that the energy of the microwave pulse 17 is so selected that the temperature 10 of the fast heated portion just reaches the allowed temperature 12. In this case the average temperature 16', after the energy supply, may be allowed to stay below the sterilization temperature 13, which was not allowed in the conventional process.

The second step means a microwave heating 18 such that the fast heated portion of the product does not fall below 10' but stays at the level 12 according to 10''. The reason that 10' fall is that the fast heated portion of the product are cooled buy the portions which are heated slowly. Thus, it is a question of applying microwave energy to such an extent that the heat loss of the fast heated portions to the colder portions is compensated.

However, that which is of interest is to quickly raise the temperature to sterilization temperature of the portions of the product which are heated slowly. However, this is exactly what takes place when applying the method of the present invention. The portions which are heated slowly are namely heated in two ways and both are at an optimum. The slow heated portions are heated partly by microwaves proportional to the power 18 of the microwaves. And such power is maintained as high as possible, having in mind the fact that the fast heated portion of the product may not reach a temperature above the allowed temperature. Additionally, the slow heated portions are heated by heat from the fast heated portions. This transfer of heat is more efficient the higher the temperature difference is. And the temperature difference is maintained at a maximum if the fast heated portion is maintained at the highest temperature according to the present invention.

The heating 11'' of the slow portions apparently will be as quick as possible because it is the sum of two heating phenomena, both of which are at a maximum at the same time, each as a result of one and the same measure. It is to be noted that the power at the microwave heating 18 is far below the power at the microwave heating 17. The difference is represented by the difference between the inclinations of the curve portions 16'' and 16. From the comparison it is realized that at the time $t_1$ there really is a drastic reduction of power, a fundamental discontinuity.

Where the microwave heating 18 is terminated, the curve portions 10'', 11'', 16'' merge into new curve portions 10''', 11''', 16''', of which the last mentioned is horizontal. The portion 11''' is still increasing indicating that the heating 18 could be teminated somewhat before 11'' has reached the sterilization level 13. In this case the curve portion 11''', after a short time, reaches the sterilization temperature. The important feature, apparently, is the fact that the heating is not terminated earlier than allowing the curve portions 11″ or 11‴ reach the sterilization temperature without unnecessary time delay. Especially, it would be a disaster to interrupt the heating 18 already at the time when the average temperature of the product 16″ reaches the sterilization level 13. In such a case it would be necessary to wait a long time before the slow product portion would be sterilized. It is feasible to continue to heating 18 somewhat after the curve portion 11″ has reached the level 13. In the coldest region of the product there will be obtained very quickly a temperature somewhat above the predetermined level 13. This means a possibility of an extra fast sterilization (short stand-by time) which is desirable for most products suited for microwave sterilization.

In the figure the case has been shown where the heating 18 is terminated just when the curve portion 11″ reaches the sterilization level 13. This does not exclude a termination of the heating 18 somewhat before this happens, in a case where the curve portion 11‴ is so raising that the sterilization level 13 nevertheless will be reached without any noticeable delay.

After the microwave heating 18, the product is left without any thermal influence during a certain stand-by time, such that the desired sterile value $F_O$ is reached also in the portions which have the lowest temperature. This has happened at the time $t_3$, when the product is ready to be cold.

Due to the fact that the lowest temperature of the product according to 11‴ in FIG. 2 is somewhat higher than the corresponding temperature 11′ in FIG. 1, there is required a substantially shorter stand-by time in FIG. 2 for reaching one and the same sterile value $F_O$. Additionally, the temperature level 12 has not been exceeded, which was the case in FIG. 1. Both said phenomena coact to maintain the product quality of the process in a uniquely way compared to the known processes. At the same time the absolute respect for the temperature level 12 means that the new process gives safety, as far as damages of the packaging material is concerned, against vapour formation which would destroy the bacteria safety or require a proces equipment designed for all to high pressures and therefore an expensive equipment.

It has been listed a number of parameters which each or together contribute to the temperature distribution represented by the vertical distance between the curves 10 and 11 in FIGS. 1 and 2.

Figure 3:
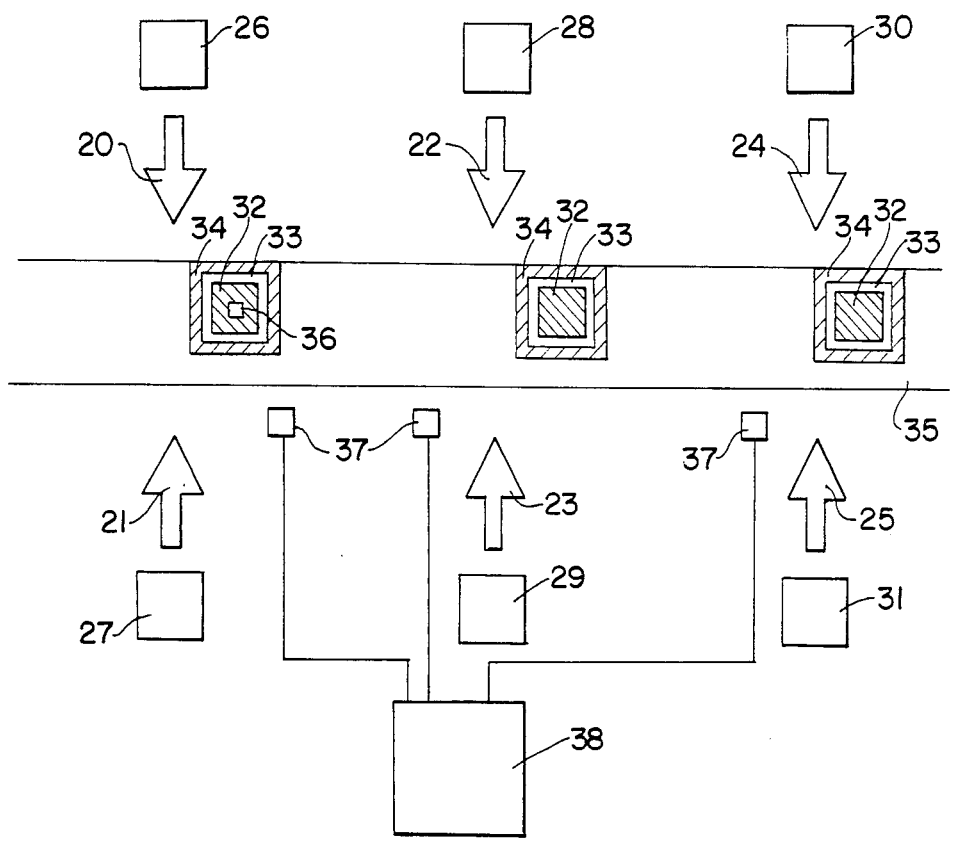
FIG. 3 shows an embodiment of the process according to the present invention.

FIG. 3 shows a side view in which three pairs of arrows, 20 and 21, 22 and 23 and 24 and 25 show the main direction for the application of three successively lower microwave fields by respective field applying means 26 and 27, 28 and 29 and 30 and 31, against product units 32, enclosed in microwave transparent material 33 and surrounded by liquid medium 34. The construction of the field applying means 26, 27, 28, 29, 30 and 31 is not further disclosed as it may be conventional. The continuous transport of the product units 32 through the successively lower fields is obtained by means 35.

If one of said factors has a dominating importance this may give an extra good reward when carrying out the method after having identified said parameter and put in countermeasures just for this parameter. The reward is a still more increased product quality depending on the shorter heating time. This depends on the fact that the heating 18 as a result of the counter-measure is given a better initial condition, to such an extent that the curve portion 11″ at $t_1$ will be placed closer to the curve portion 10″ (at level 12) than without said countermeasure. The level as well as the duration of the necessary heating 18 according to the invention will be considerably reduced. As a compensation the microwave heating 17 will be carried out by using a somewhat increased power. The process will not be any longer due to this without any counter-measures. of the product for giving the interior thereof the necessary heating, a suitable counter-measure resides in cooling the surface of the product by a surrounding medium, for instance water, in such a good time that the effect will be sufficient also a distance inside the product. The temperature of the surrounding medium is not allowed to exceed the temperature desired in the product, but is controlled such that it reaches this temperature at the end of the microwave treatment or process, meaning that also the surface layer reaches such a treatment degree.

In the description just made and in FIG. 2, the heating 17 and 18 have been represented as a continuous heating. This is not the case in practice. The microwaves as such do not, accurately seen, give a continuous heating. Analogue to an ordinary AC current in a resistor, the microwaves give the maximum heat at the wave peaks. If for instance microwaves of a frequency of 2450 MHz are used the heating will be periodic and have a frequency of 4900 MHz. If the microwaves are producted by magnetrones, which are supplied by a rectified one phase 50 cycle current, the microwave heating discloses pronounced maxima, each one occuring at an interval of one hunderedth of a second.

If the products are heated by a number of microwave applicators during the transport thereof and the applicators are arranged at a certain distance from each other, there is also obtained a certain modulation or pulse effect. This means that each one of the simple power graphs 17, 18 actually should be replaced by a number of consequtive pulses having a surface contents and a distribution making them generally equivalent to 17 and 18. The characteristic details of the microwave heating 17, however, are not important, but so is the total energy and the duration.

For the microwave heating 18 the same is valid with the addition that the smeared-out power of juxtapositioned contributions should vary with the time according to the criteria of the main claim. The reason for not splitting up 17 or 18 in FIG. 2 in pulses, which as a rule will be the case in practice, is an ambition not to further contribute to the complexity of the figures. The vention according to the claims should therefore be valid in that case where the microwaves are delivered to the product in the shape of pulses or as continuous power.

The method according to the accompanying claims has been exemplified in an application where it is started out from a product at 60° C. and which aims at obtaining a nondestructive sterilization at a temperature somewhat above 123° C. As mentioned, the method is suitable also for other type of heat treatment or processing where speed is desired, for instance pasteuriztion. In such a case the desired temperatures could be for instance 70° to 90° C.

A third application is preheting before a sterilization which thereafter basically is carried out according to the example in FIG. 2. Also in this case the problem is to heat quickly and such that end temperature of the product is given an unnoticeable distribution. In such a case the initial temperature could for instance be 10° to 20° C. and the desired temperature about 60° C. It may also be valuable to reach this preheating temperature quickly. Not at least as far as food products having fat as well as protein are concerned. In such products it is of advantage if the denaturation of proteins, which nevertheless occurs at a certain temperature, will take place so quickly that fat that melts at said temperature does not have time to leave the food but will be blocked inside in a dispersed form.

Of course, it is essential that the method according to the invention may be put into real practice. In this case information is neccessary on temperatures which may arise in the product during the processing thereof.

A method which has been tested to a large extent and found to work is to measure the temperature at certain suitable portions at some selected times. A suitable time is close to $t_1$, whereby the measurement is carried out at that point which according to experience will be the hottest. Thereafter it is suitable to measure some further times during an estimated time for the heating 18. The hottest point is measured and at the end of the treatment also the coldest. For a certain product the correct times for tracing the measurement points will be quickly established and the regions which will assume extreme temperatures will be identified. If the measurement is carried out by thermoelements which are placed inside the product, the measurement may be facilitated by stopping the transport of the product and switching off the microwaves during such a very short time of measurement. If the measurement is carried out by a not conductive measuring element, for instance an optical fibre having a suitable temperature sensor at the end thereof, the microwaves do not have to be switched off during the measurement.

Another method is based on the known fact that the temperature in a medium is affected by the speed of sound in the medium. By measuring the travel time of sound pulses in suitable directions through the product there will be obtained, under certain conditions, a possiblity to translate the measured values to temperature information.

A third method means use of electromagnetic waves from the surface of the product and from layers further down in the product for identifying the temperature ditribution inside the product. There is only needed a passive sensing. Several frequences are observed. Computer processing which translates the character of the radiation field to a temperature distribution inside the product is complex, but basically known from the meteorology.

In that case where sound waves or electromagnetic waves are used for temperature measurement such measurement may be a continuous one and without any need for puncturing the packaging material of the product. This means that the control of the microwave heating according to the present invention may be obtained automatically by simple servocircuits and switches.

It is to be noted that the point which during the processing or treatment will appear as the hottest, necessarily does not have to be stationary inside the product but may have different positions from time to time during the process. This is also true for the coldest point.

I claim:

1. In a continuous method of heating a product having at least one faster microwave heating portion and at least one slower microwave heating portion to a uniform predetermined temperature sufficient to sterilize the product without loss of odor, taste, texture, color or vitamin content quality, said method comprising transporting said product through a plurality of microwave fields comprising a first higher energy microwave field and one or more successively lower energy microwave fields, the improvement comprising the steps of attenuating said first microwave field to an energy level sufficient to heat said faster microwave heating portions of said product to said predetermined temperature, attenuating said one or more successively lower energy microwave fields to energy levels sufficient both to maintain the temperature of said faster microwave heating portions at said predetermined temperature and heat said slower microwave heating portions to said predetermined temperature; and continuing the transport of said product through said successively lower energy microwave fields until said slower microwave heating portions of said product reach said predetermined temperature.

2. The method of claim 1, wherein said product is a food product.

3. The method of claim 1, wherein said predetermined temperature comprises the pasteurization temperature of the product.

4. The method of claim 1, wherein said product is enclosed in a microwave transparent material.

5. The method of claim 1, wherein said product is encompassed by a liquid medium having a dielectric constant of the same order as said product, and the temperature of the liquid medium is controlled such that the temperature of the medium and the surface of the product are maintained at the predetermined temperature.

6. The method of claim 1, which further includes the steps of measuring the product temperature and adjusting the microwave energy levels when said predetermiend temperature is reached.

7. The method of claim 6, wherein the product temperature is measured in one or more faster microwave heating portions and the product is transported to a lower enery level microwave field when the predetermined temperature is obtained.

8. The method of claim 7, wherein the product temperature is measured in one or more slower microwave heating portions and the application of microwave energy is terminated when the predetermined temperature is obtained.

9. The method of claim 6, wherein the product temperature is measured by one or more thermoelements placed inside of the product.

10. The method of claim 6, wherein the product temperature is meausred by one or more optical fiber temperature sensors.

11. The method of claim 6, wherein the product temperature is determined with sound pulses.

12. The method of claim 6, wherein the product temperature is determined by measuring the electromagnetic energy emitted from the surface of the product.

13. The method of claims 11 or 12 wherein the temperature measurement is continuous and the microwave energy level is controlled by servo-circuits and switches.

* * * * *

UNITED STATES PATENT AND TRADEMARK OFFICE
CERTIFICATE OF CORRECTION

PATENT NO.   : 4,808,783

DATED        : February 28, 1989

INVENTOR(S)  : Stenstrom

It is certified that error appears in the above-identified patent and that said Letters Patent is hereby corrected as shown below:

Column 8, line 8, after "counter-measures.", insert -- Figure 3 depicts both temperature detection means 36 within the product units 32 and temperature detection means 37 external to product unit 32 which monitor the product temperature and provide this information to a microprocessor connected to servo-circuits and switches 38 that adjust the microwave field applying means 26, 27, 28, 29, 30 and 31 to attenuate the energy levels of the successively lower energy microwave fields. The temperature detection means 36 and 37 may be conventional and may be any suitable system for temperature detection, including the systems described below. The microprocessor connected to servo-circuits and switches 38 is not further disclosed, as it may be conventional.

In the case where a heavy attenuation of the product necessitates a too strong microwave heating of the surface --.

Signed and Sealed this

Twenty-fifth Day of July, 1989

Attest:

DONALD J. QUIGG

Attesting Officer

Commissioner of Patents and Trademarks